United States Patent
Kuo et al.

(10) Patent No.: US 8,069,895 B2
(45) Date of Patent: Dec. 6, 2011

(54) FILM-REMOVING DEVICE

(75) Inventors: Pei-Chin Kuo, Taipei Hsien (TW);
Juey-Fong Chang, Taipei Hsien (TW);
Wen-Tao Wang, Shenzhen (CN);
Zhi-Gang Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 736 days.

(21) Appl. No.: 12/211,052

(22) Filed: Sep. 15, 2008

(65) Prior Publication Data

US 2009/0229764 A1   Sep. 17, 2009

(30) Foreign Application Priority Data

Mar. 12, 2008 (CN) .......................... 2008 1 0300548

(51) Int. Cl.
*B32B 38/10* (2006.01)

(52) U.S. Cl. ......... 156/751; 156/247; 156/715; 156/759

(58) Field of Classification Search ................... 156/247, 156/702, 715, 751, 759
See application file for complete search history.

(56) References Cited

U.S. PATENT DOCUMENTS

| 3,522,136 | A  | * | 7/1970 | McCormick et al. | 156/767 |
| 4,282,056 | A  | * | 8/1981 | Okui | 156/519 |
| 4,599,125 | A  | * | 7/1986 | Buck | 156/248 |
| 6,786,266 | B2 | * | 9/2004 | Fukada | 156/759 |
| 2007/0151667 | A1 | * | 7/2007 | Tani et al. | 156/344 |
| 2008/0185100 | A1 | * | 8/2008 | Jang et al. | 156/344 |
| 2008/0236743 | A1 | * | 10/2008 | Kye et al. | 156/344 |

FOREIGN PATENT DOCUMENTS

| JP | 09197394 A | * | 7/1997 |
| JP | 09267423 A | * | 10/1997 |

* cited by examiner

*Primary Examiner* — Mark A Osele
(74) *Attorney, Agent, or Firm* — Altis Law Group, Inc.

(57) ABSTRACT

An exemplary film-removing device for removing a protecting film from a workpiece includes a main body and a film-removing mechanism. The film-removing mechanism includes a suspending arm and a roller. The suspending arm has a first end rotatably connected to the main body. The roller is rotatably connected to a second end, opposite to the first end, of the suspending arm. The roller is driven to rotate by movement of the workpiece.

17 Claims, 4 Drawing Sheets

FILM-REMOVING DEVICE

BACKGROUND

1. Technical Field

The present disclosure generally relates to film-removing devices, and particularly to an automatic film-removing device.

2. Discussion of the Related Art

Belt-shaped workpieces usually have protecting films made of polyethylene (PE) on a surface. Before machining the belt-shaped workpiece, the protecting film of the belt-shaped workpiece should be removed. Typically, the protecting film is manually removed or removed by a motor. However, since manual labor is inefficient and expensive. When the protecting film is removed by a motor, a series of transmission mechanisms, for example gears, should be applied to between the motor and a film-removing member driven by the motor, so that a linear velocity of the film-removing member is consistent to that of the belt-shaped workpiece. That is because linear velocities of the motor and the belt-shaped workpiece are usually different. Therefore, removing a protecting film with a motor is expensive and difficult.

Therefore, a new film-removing device is desired in order to overcome the above-described shortcomings.

SUMMARY

An exemplary film-removing device for removing a protecting film from a workpiece includes a main body and a film-removing mechanism. The film-removing mechanism includes a suspending arm and a roller. The suspending arm has a first end rotatably connected to the main body. The roller is rotatably connected to a second end, opposite to the first end, of the suspending arm. The roller is driven to rotate by movement of the workpiece.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present film-removing device. Moreover, in the drawings, like reference numerals designate corresponding parts throughout several views, and all the views are schematic.

DETAILED DESCRIPTION

Reference will now be made to the drawings to describe certain inventive embodiment of the present film-removing device in detail.

Figure 1:
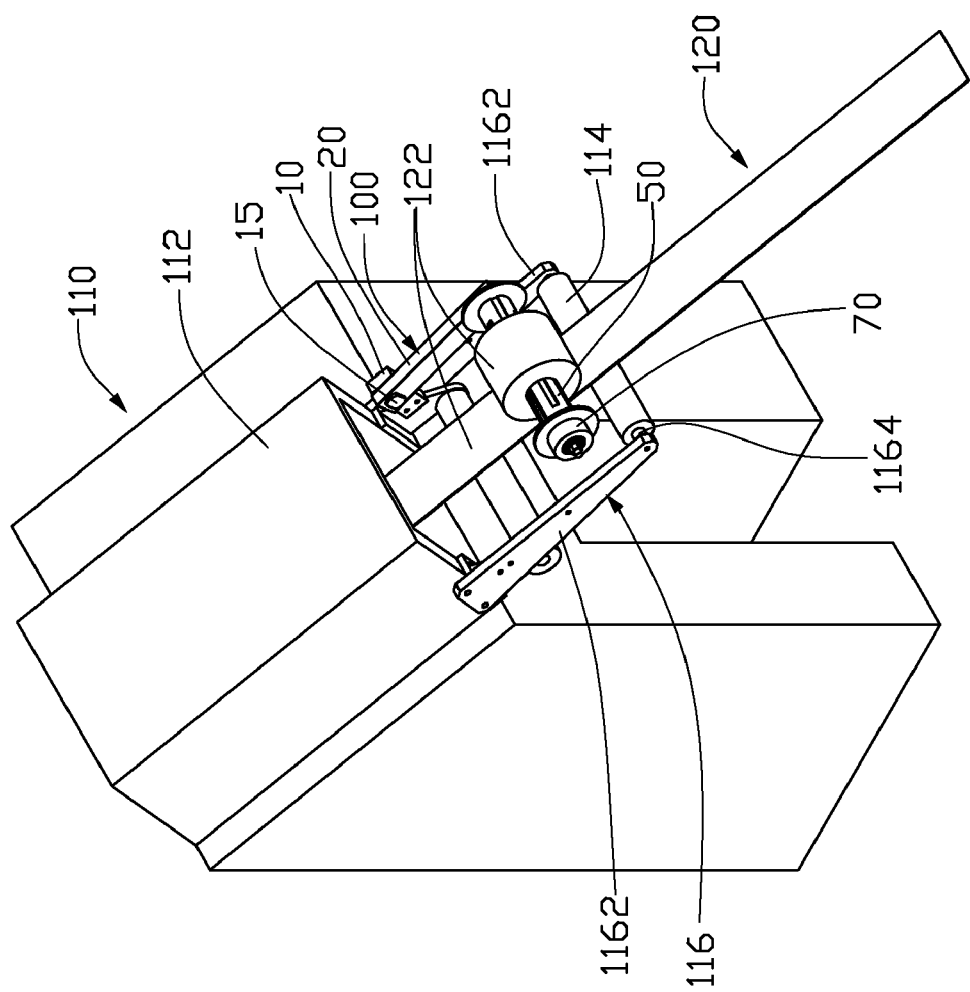
FIG. 1 is an assembled, isometric view of a film-removing device in accordance with an exemplary embodiment of the present disclosure.

FIG. 1 illustrates one embodiment of a belt-shaped workpiece 120 passing through a film-removing device 110, and then transmitted to a following work process. The belt-shaped workpiece 120 has a protective film 122 made of polyethylene (PE). The film-removing device 110 may be used to remove the protecting film 122 from the belt-shaped workpiece 120.

The film-removing device 110 includes a film-removing mechanism 100, a main body 112, a support barrel 114, and a connecting bracket 116. The connecting bracket 116 includes two side arms 1162 and a shaft 1164. Each side arm 1162 includes a first end and second end opposite to the first end. The shaft 1164 is configured for connecting the first ends of the side arms 1162. The second ends of the side arms 1162 are connected to the main body 112. The support barrel 114 is rotatably sleeved on the shaft 1164 and configured for supporting the belt-shaped workpiece 120.

Figure 2:
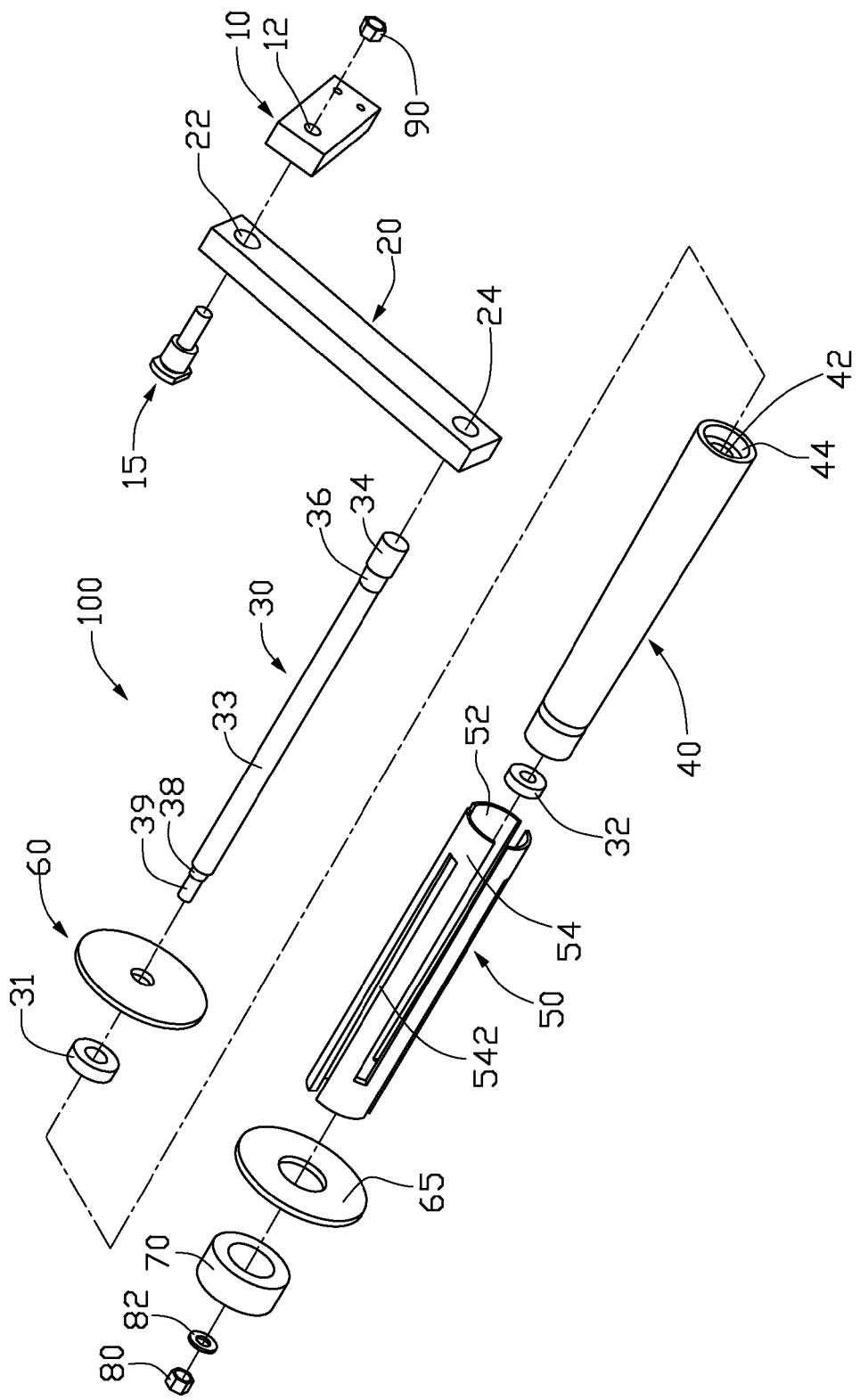
FIG. 2 is part of an exploded, isometric view of the film-removing device in FIG. 1.
Figure 3:
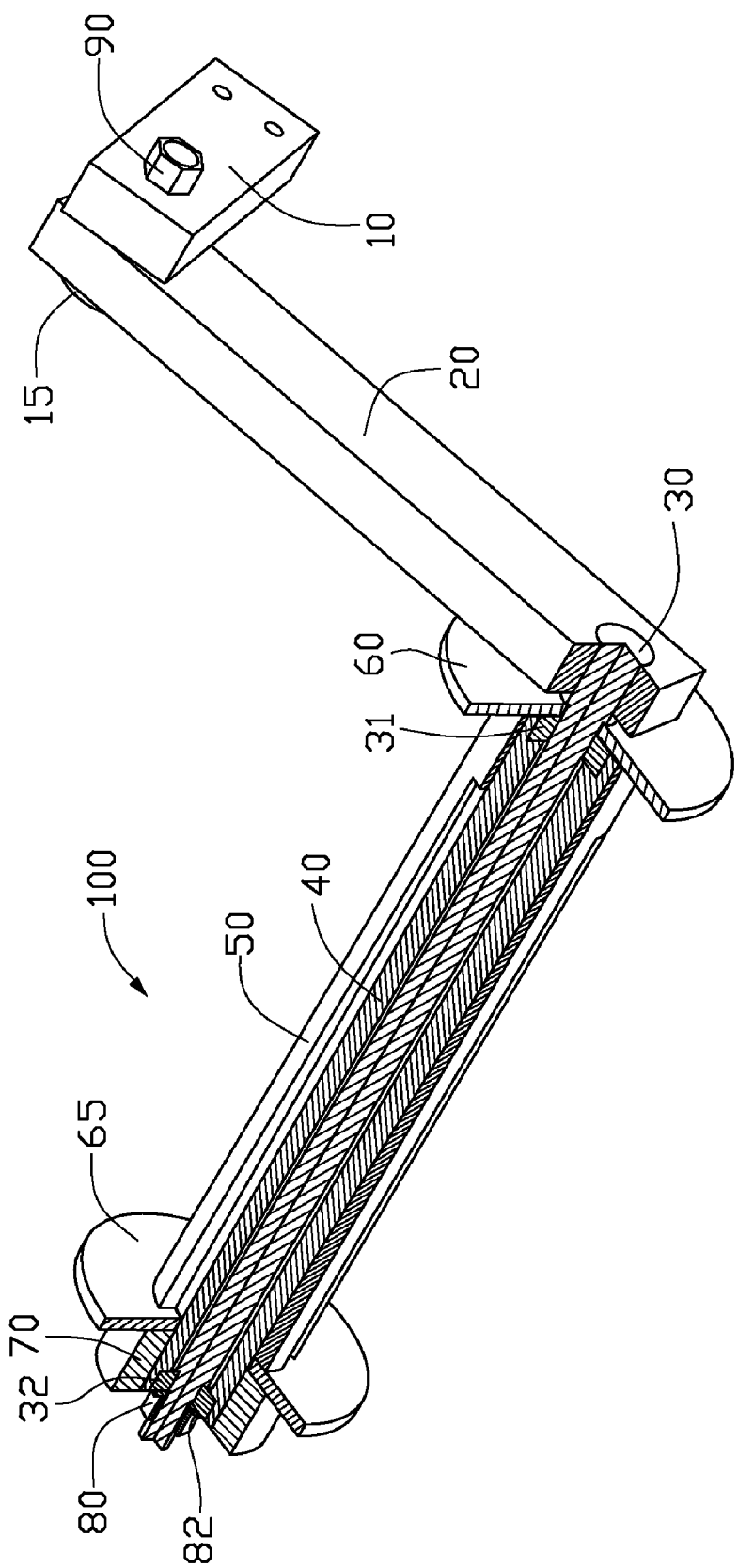
FIG. 3 is a partially cut-away, isometric view part of the film-removing device in FIG. 1.

Referring to FIG. 2 and FIG. 3, the film-removing mechanism 100 includes a connecting sheet 10, a pivot member 15, a suspending arm 20, a connecting shaft 30, two bearings 31, 32, a tube 40, a roller 50, a plurality of washers 60, 65, 82, a fastening member 70, and two nuts 80, 90.

The connecting sheet 10 defines a connecting hole 12 at a first end of the connecting sheet 10. A second end, opposite to that of the first end, of the connecting sheet 10 is configured to be fixed to the one of the side arm 1162. The suspending arm 20 includes a first end (not labeled) and a second end (not labeled) opposite to the first end. The suspending arm 20 defines a pivot hole 22 at the first end and a mounting hole 24 at the second end. The pivot member 15 runs through the pivot hole 22 of the suspending arm 20 and the connecting hole 12 of the connecting sheet 10, and engages with the nut 90, thus rotatably connecting the suspending arm 20 and the connecting sheet 10.

The connecting shaft 30 includes a main shaft portion 33 and a first, a second, a third, and a fourth shaft portion 34, 36, 38, and 39. The first, second shaft portions 34, 36 the main shaft portion 33, and the third, fourth shaft portions 38, 39 forms the connecting shaft 30 in the written order. The first shaft portion 34 of the connecting shaft 30 is configured to fixedly engage in the mounting hole 24 of the suspending arm 20. The bearings 31, 32 are configured to be mounted on the second shaft portion 36 and the third shaft portion 38 respectively. The washers 60, 65, 82 are dish-shaped.

The tube 40 is shaped as a conical frustum having an conical outer surface. The tube 40 defines a cylindrical through hole 42 in the center of a diameter of the tube 40, a first end hole 44 in one end, and a second end hole (not labeled) in the other end. The through hole 42, the first end hole 44, and the second end hole are aligned along a cylindrical axis of the tube 40. The first end hole 44 and the second end hole are configured to receive the bearings 31, 32 respectively.

The roller 50 is substantially shaped as a tube. The roller 50 defines a conical receiving hole 52. The roller 50 includes a sidewall 54 defining a plurality of cutouts 542 extending parallel to the axis of the roller 50. The slots 542 extend from one end partially to the other end of the roller 50, and adjacent slots 542 have different starting ends. Therefore, the roller 50 is squeezable inwards. When the protecting film 122 is removed from the belt-shaped workpiece 120 and enlaces on the roller 50, squeezing the roller 50 inwardly can facilitate removing protecting film 122 therefrom.

The fastening member 70 may be a nut configured for screwing on an end of the tube 40 so as to fasten the components of the tube 40.

Figure 4:
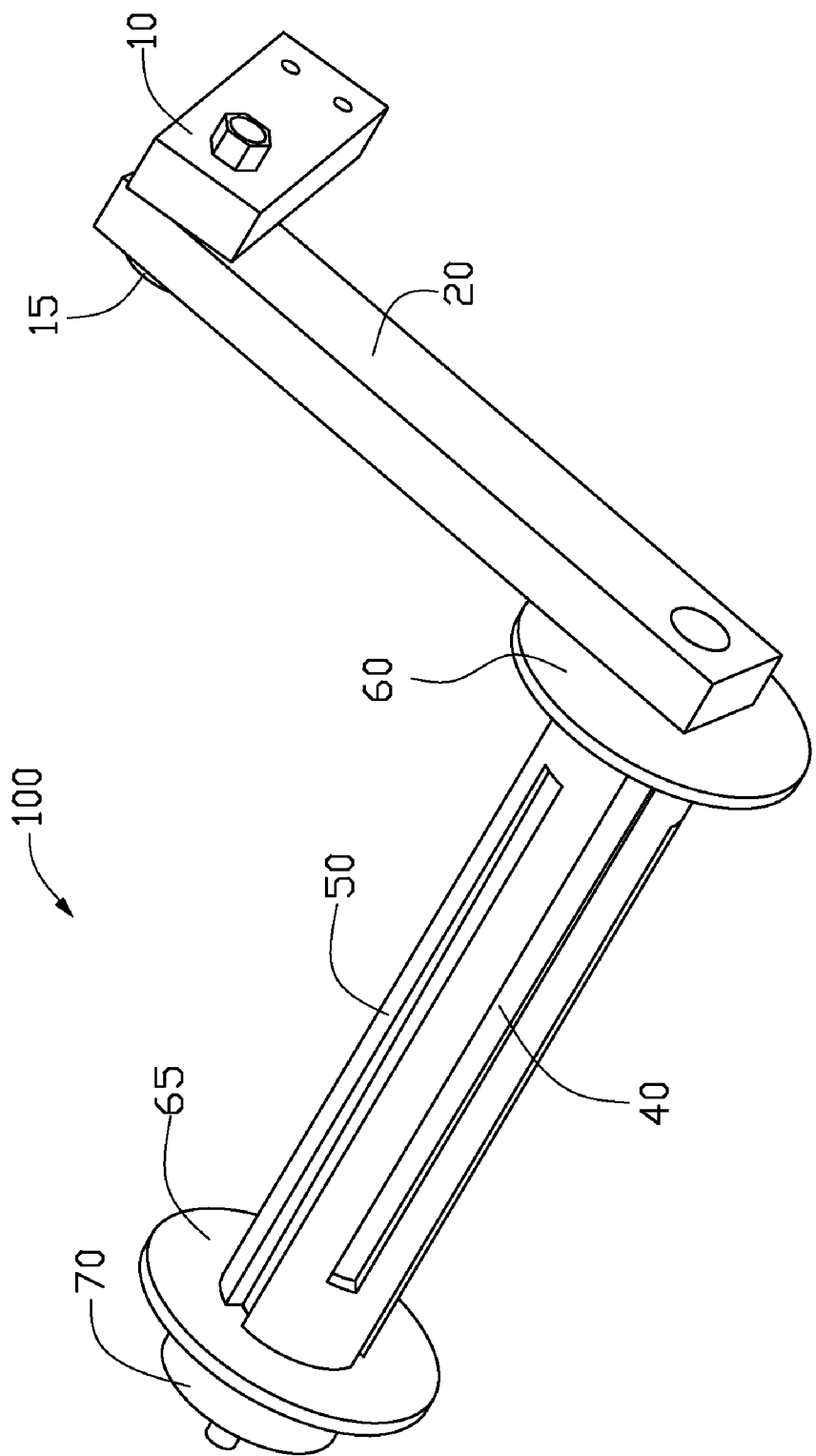
FIG. 4 is an assembled, isometric view of part of the film-removing device in FIG. 1.

Referring also to FIG. 3 and FIG. 4, when assembling the film-removing mechanism 100, the connecting shaft 30 is fixed to the suspending arm 20. The washer 60, the bearing 31, the tube 40, and the bearing 32, and the washer 82 are sleeved on the connecting shaft 30 in that order. Then the nut 80 is screwed on the fourth shaft portion 39 of the connecting shaft 30. Thus, the tube 40 is rotatable relative to the shaft portion 30 about a first axis. The roller 50 and the washer 65 are sleeved on the tube 40 and the fastening member 70 is screwed on the end of the tube 40. The suspending arm 20 is rotatably connected to the connecting sheet 10 via the pivot member 15 and the nut 90. The suspending arm 20 is rotatable relative to the connecting sheet 10 about a second axis parallel to the first axis.

When assembling the film-removing device 110, the connecting sheet 10 is fixed to one of the side arms 1162 of the connecting bracket 116. The sidewall 54 of the roller 50 resists the belt-shaped workpiece 120 and touches the protecting film 122. The belt-shaped workpiece 120 is positioned between the roller 50 and the support barrel 114.

When removing the protecting film 122 of the belt-shaped workpiece 120, firstly, an end of the protecting film 122 is peeled from the belt-shaped workpiece 120 and rolled around the roller 50. Then when the belt-shaped workpiece 120 moves, it drives the roller 50 to rotate, thus the protecting film 122 is continuously separated from the belt-shaped workpiece 120 and enlaced around the roller 50. In the separating process, the roller 50 displaces upwards according a thickness (amount) of the protecting film 122 enlaced around the roller 50, because the suspending arm 20 is rotatable around one end of the suspending arm 20.

In the film-removing device 110, linear velocities of the roller 50 and the belt-shaped workpiece 120 are substantially the same. Therefore, no transmission mechanism, such as gears, for example, is needed so the film-removing device 110 has a low cost. In addition, to removed the peeled film 122a, the fastening member 70 is disassembled from the tube 40, the roller 50 together with the peeled film 122 is unsleeved from the tube 40, and the roller 50 is squeezed. Thus, the protecting film 122 can be easily stripped from the roller 50. It is very easy to take the roller 50 away from the tube 40, because the conical frustum-shaped tube 40 is received in the conical receiving hole 52 of the roller 50.

In alternative embodiments, the film-removing mechanism 100 may have a first suspending arm 20 and a second suspending arm (not shown) substantially same as the first suspending arm 20, with the second suspending arm 20 disposed at the other end of the connecting shaft 30.

Finally, while various embodiments have been described and illustrated, the invention is not to be construed as being limited thereto. Various modifications can be made to the embodiments by those of ordinary skills in the art without departing from the true spirit and scope of the present disclosure as defined by the appended claims.

What is claimed is:

1. A film-removing device for removing a protecting film from a workpiece, the film-removing device comprising:
a main body; and
a film-removing mechanism comprising:
a suspending arm having a first end rotatably connected to the main body; and
a roller rotatably connected to a second end of the suspending arm, opposite to the first end of the suspending arm, wherein the roller is driven to rotate by movement of the workpiece.

2. The film-removing device as claimed in claim 1, wherein the film-removing mechanism further comprises a connecting shaft and a tube, the connecting shaft is fixed to the second end of the suspending arm, the tube is rotatably sleeved on the connecting shaft, and the roller is sleeved on the tube.

3. The film-removing device as claimed in claim 2, wherein the tube is shaped as a conical frustum, and the roller defines a conical receiving hole for receiving the tube.

4. The film-removing device as claimed in claim 2, wherein the film-removing mechanism further comprises a connecting sheet, one end of the connecting sheet is fixed to the main body, the suspending arm is rotatably connected to the connecting sheet via a pivot member and a nut.

5. The film-removing device as claimed in claim 4, wherein the film-removing mechanism further comprises a fastening member, two bearings and a plurality of washers including a first washer, a second washer and a third washer, the bearings are sleeved on the connecting shaft and engage with an inner surface of the tube, the fastening member is fixed at an end of the tube.

6. The film-removing device as claimed in claim 5, wherein the connecting shaft includes a main shaft portion and first, second, third, and fourth shaft portions, the first, second shaft portions, the main shaft portion, and the third, fourth shaft portions extend in that order, the first washer is disposed on the connecting shaft and between the first shaft portion and the tube, the second washer is disposed on the tube and between the fastening member and the roller, the third washer is disposed on the connecting shaft and between a nut and one of the bearings.

7. The film-removing device as claimed in claim 5, wherein the tube defines a cylindrical through hole in the center of the tube, two end holes at opposite ends of the tube, the through hole and the end holes are aligned along an axis of the tube, the end holes are configured for receiving the bearings correspondingly.

8. The film-removing device as claimed in claim 1, wherein the roller is squeezable inwards.

9. The film-removing device as claimed in claim 8, wherein the roller is substantially shaped as a tube, the roller has a sidewall and the sidewall defines a plurality of slots extending parallel to an axis of the roller, the roller has a first end a second end opposite to the first end, the slots extend from one of the first and second ends and extend to a position adjacent to the other one of the first and second ends of the roller.

10. The film-removing device as claimed in claim 1, wherein the film-removing device further comprises a support barrel and a connecting bracket, the connecting bracket includes two side arms and a shaft connecting first ends of the side arms, second ends opposite to the first ends of the side arms are connected to the main body, and the support barrel sis rotatably sleeved on the shaft.

11. The film-removing device as claimed in claim 1, wherein the workpiece is belt-shaped.

12. A film-removing device, comprising:
a main body; and
a film-removing mechanism comprising:
a roller being rotatable, thus configured for removing a film from a surface of a belt-shaped workpiece, the roller having an axis, wherein the roller is driven to rotate by movement of the workpiece; and
a suspending arm connected to the main body and the roller, the suspending arm configured for making the axis of the roller to displace away from or closer to the workpiece.

13. The film-removing device as claimed in claim 12, wherein the film-removing mechanism further comprises a connecting shaft and a tube, the connecting shaft is fixed to an end of a suspending arm, the tube is rotatably sleeved on the connecting shaft, and the roller is sleeved on the tube.

14. The film-removing device as claimed in claim 13, wherein the tube is a conical frustum, and the roller defines a conical receiving hole for receiving the tube.

15. The film-removing device as claimed in claim 12, wherein the roller is squeezable inwards.

16. The film-removing device as claimed in claim 15, wherein the roller is substantially shaped as a tube, the roller has a sidewall and the sidewall defines a plurality of slots extending parallel to an axis of the roller, the roller has a first end a second end opposite to the first end, the slots extend from one of the first and second ends and extend to a position adjacent to the other one of the first and second ends of the roller.

17. The film-removing device as claimed in claim 12, wherein the workpiece is belt-shaped.

* * * * *